United States Patent [19]

Dautel et al.

[11] 4,147,261

[45] Apr. 3, 1979

[54] LOADING DEVICE FOR GOODS VEHICLES

[75] Inventors: Helmut Dautel, Leingarten; Mathias Fritz, Oedheim; Gerd Bar, Heilbronn-Neckargartach, all of Fed. Rep. of Germany

[73] Assignee: Firma Emil Dautel, Kipperbau, Fed. Rep. of Germany

[21] Appl. No.: 856,187

[22] Filed: Nov. 30, 1977

[30] Foreign Application Priority Data

Nov. 30, 1976 [DE] Fed. Rep. of Germany ....... 2654286

[51] Int. Cl.$^2$ .............................................. B60P 1/44
[52] U.S. Cl. .................................................. 414/557
[58] Field of Search ...................... 214/77 P, DIG. 10

[56] References Cited

U.S. PATENT DOCUMENTS 3,977,544  8/1976  D'Hollander ...................... 214/77 P

FOREIGN PATENT DOCUMENTS 2253654  5/1974  Fed. Rep. of Germany ......... 214/77 P Primary Examiner—Robert G. Sheridan Attorney, Agent, or Firm—Robert E. Burns; Emmanuel J. Lobato; Bruce L. Adams

[57] ABSTRACT

A loading device for a goods vehicle comprises a lifting platform which can be raised to the height of the loading surface and then pivoted into a vertical position to form a tail gate. The rear end of the lifting platform can also be tilted downwardly when the lifting platform is at road level or a loading surface height. The lifting platform is supported and operated by two hydraulic rams in conjunction with two lifting arms and two guiding arms. The rams are hingedly connected with the lifting platform differently so that both serve to raise the platform and one serves to pivot the platform to vertical position after the platform has reached loading surface height. The cylinders of the two rams are commonly connected to a liquid reservoir through a valve-controlled return line containing a resistance so that pressure in the two cylinders is equalized and the different load moments resulting from the different hinge connections of the two rams causes the platform to swing down from a vertical position to a horizontal position before it is lowered. The guiding arms may consist of telescopic arms or hydraulic rams.

29 Claims, 14 Drawing Figures

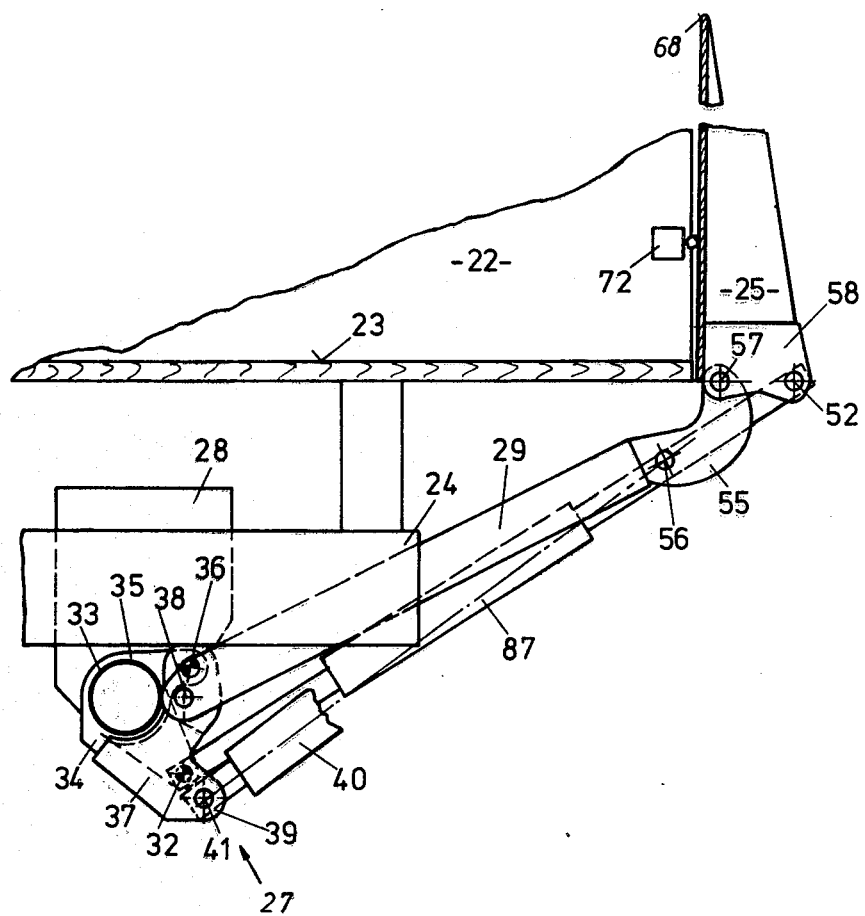
Fig. 14
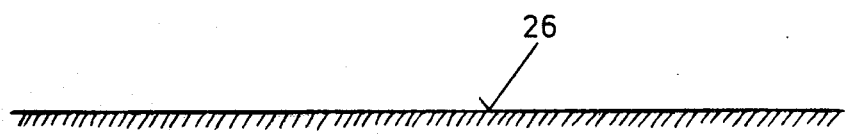

LOADING DEVICE FOR GOODS VEHICLES

FIELD OF INVENTION

The invention relates to loading devices for goods vehicles, including a lifting platform which can be raised to the height of the loading surface of the vehicle and is supported by lifting and guiding arms in a parallelogram configuration which arms are hinged to lifting platform parts and to a support system which is disposed between road level and the loading surface and is fixed to the vehicle or the superstructure of the vehicle. The term goods vehicle is herein used in a generic sense to include trucks, vans, trailers and other vehicles designed for carrying freight or goods of all kinds.

BACKGROUND OF THE INVENTION

The most diverse loading devices for goods vehicles are known. They can be attached to a self-propelled goods vehicles, trailers or other goods vehicles with a fixed loading platform, with a fixed superstructure or they can also be attached to vehicles with interchangeable superstructures. They can also be attached to the vehicle superstructure itself, which can be interchangeable, for example for semi-trailer vehicles. Such devices are advantageously attached so that the lifting platform when raised adjoins the rear edge of the loading surface. However, the loading devices can also be attached laterally at the side of the vehicle or superstructure.

Numerous efforts have been made to achieve advantageous kinematic conditions. The designs were however adapted to the prevailing requirements, depending on whether the lifting platform can be pivoted into the vertical position to function as a tail gate or side wall, or depending on whether special angular conditions are desired. Some tests have also been made with combination systems. In a loading device system disclosed by the German Offenlegungsschrift No. 22 53 654, the ends adjoining the lifting platform of two piston-cylinder rams both act at a distance from the pivoting axis on the lifting platform so that the latter can be upwardly pivoted. With a construction of this kind there is a risk of the outer end of the lifting platform tilting upwards instead of moving up and down as a horizontal surface. Special steps must be taken to counter such tilting. Furthermore, in the region of the pivoting means, which are fixed to the vehicle, this construction is provided with an intermediate link which bears at different places of the support system and/or of the parallelogram links, depending on its particular construction. This results in particularly complicated conditions which can hardly be controlled, owing to the unstable position of the intermediate links which must be multi-jointed. In one solution to the problem in which one side of the intermediate link is hinged to the vehicle and the other is fixedly supported on the vehicle, all joint axes at the support system end are situated in one plane, a feature which does not allow optimum kinematic conditions to be obtained.

In view of the many different types of vehicles and due to the different requirements made thereon, it is necessary for loading devices to fulfill the most diverse functions and to perform widely different movements and, in view of the need for being operated by only one person, for example the driver, they must be constructed in their entirety as advantageously as possible to comply with safety regulations and to ensure efficiency. This gives rise to many problems which can be solved on the one hand mechanically and on the other hand hydraulically, and it is necessary to judge whether a kinematic solution or a hydraulic solution is to be given perference for reasons of operation, costs or safety.

SUMMARY OF THE INVENTION

One object of the invention is to avoid the disadvantages of known loading devices, but to retain their advantages as far as possible and combine them with each other and more particularly to achieve the advantages mentioned below and to provide an optimum, versatile loading device. Depending on the particular type of use, it is therefore necessary to employ different apparatus parts, the individual functions of some of which are known but to employ them in a different combination and in a different way.

It is also an object of the invention to provide loading devices designed in such a way that by using the largest number of completely identical parts and by using the smallest possible number of parts which differ from each other, one can assemble the largest possible number of different kinds of loading devices capable, with the least possible effort and depending on requirements, of performing different motions and functions, to which end the different hinge axes are positioned so as to satisfy optimum kinematic conditions and force conditions for the various kinds of use. The principle of the invention resides in optimizing the position of the hinge axes in order to provide a good unit construction system and further features are added in order to complete the principle.

DESCRIPTION OF THE INVENTION

According to a first aspect of the invention there is provided a loading device for a goods vehicle, including a lifting platform which can be raised to the height of the loading surface of the vehicle and can be pivoted into a vertical position to form a tailgate or side wall and is supported by lifting and guiding arms in a parallelogram configuration which arms are hinged to lifting platform parts and to a support system which is provided between the road level and the loading surface and is fixed to the vehicle or to the superstructure of the vehicle, and two pressure-fluid-operated piston-cylinder rams which at their respective ends adjoining the support system are hinged at fixed locations with respect to the vehicle or to the superstructure while the lifting platform is lowered, raised, closed and opened and which act on the lifting arms and on the lifting platform. A hinge with its axis parallel to the hinge axes of the lifting and guiding arms is provided in the region of the lifting platform ends of the said arms for closing and opening the lifting platform. The lifting arms lie above the rams and are constructed to be non-extensible during closing and opening. The lower support elements for the lifting platform are movable out of the position associated with the horizontal position of the lifting platform in accordance with the closing pivoting angle of the platform means for controlling the pressure medium. In accordance with the invention, one of said rams, serving only as a platform-lifting ram, is hinged to one lifting arm in the region of its upper end and the other ram, functioning as a platform-lifting and closing unit, is hinged to an arm fixed to the lifting platform at a distance from the hinge axis of said lifting platform. The lifting ram and the lifting-closing ram are connected to a common pressure medium duct and a common restrictor and a common valve are provided for controlling the platform-lowering, lifting, closing and opening procedures.

In known loading devices with two rams, the ends adjoining the platform are always hinged on a common axis either only on the lifting arms or only on the lifting platform. It has now been found that it is possible with surprisingly simple means to provide a construction which is stable over the entire working range if one ram acts on the lifting arm and the other ram acts on the lifting platform. Hydraulic controls must then be provided to ensure transmission of pressure from one ram to the other so as to equalize the pressure at all times. This results in the following surprising effect: in movement from a specific lifting platform position which deviates from the vertical, and until the platform is mechanically supported in a horizontal position, the dead weight of the platform produces a moment about the hinge axis which applies thrust to the pistons of the hydraulically communicating rams, such thrust being greater than the force required for retaining or raising the entire lifting platform. The combination of kinematically advantageous hinging and hydraulic coupling produces reliable retention or securing of the platform in the horizontal position without the interposition of additional retaining elements. To this end the arrangement is such that the rams at the support system end are hinged at fixed locations to the vehicle or to the superstructure, while the lifting platform is lowered, raised, closed and opened. The hinging, however, can also be arranged so that after the lifting platform bears on the ground or is locked in the top position or some other position, the rear end of the loading platform can be downwardly inclined if the lifting arm, and advantageously also the rams, cease to be fixedly hinged to the vehicle for this part of the possible movement phases, by virtue of a supporting lever, which is fixed, but this is of no significance for the main functions of raising and lowering, closing and opening, and it is also possible to dispense therewith either if no inclining of the lifting platform end is necessary or if this can be achieved by other means, for example hydraulic means.

The precise position of the hinge axes of the rams on the one hand on one lifting arm and on the other hand on the loading platform can be determined in dependence on the loads that are to be raised, the size of the lifting platform, the overhang of the loading surface of the vehicle superstructure and the like, using conventional calculating and geometrical design methods with due reference to the fact that, owing to the different hinging of their outer ends, the two rams are not pivoted completely uniformly in one common plane during raising and lowering, but the hinging is selected so that the rams are situated approximately in a plane which extends through the common hinge axis that is fixed with respect to the support. In one advantageous embodiment, the axes are closest to this plane in the top and bottom positions while the maximum deviation occurs in the middle positions.

The reliable positioning of the lifting platform in most settings and more particularly in all working settings is therefore achieved only with elements which are in any case required, namely by the skilled construction and correct hinging thereof, and the pivoting range calling for the maximum force in manual operation occurs on closing, i.e. upward pivoting of the lifting platform into the tailgate (or side wall) position by the respective ram. Depending on the kind of tailgate and on the locking elements, required in any case for travelling and comfort, it is possible for the last part of the pivoting angle to the vertical closed position, which cannot be automatically bridged by the steps disclosed hereinabove, to be easily obtained by manual means because the safety hooks or the like must in any case be engaged or released by the operating person. It is therefore easy for the lifting platform to be pushed home or to be opened through the last part of the pivoting angle.

Fully automatic opening from the top position can however also be achieved by a few further elements. These include additional means for supporting the lifting platform in the region adjacent to the vertical position, more particularly the last third of the closing-pivoting motion. Support can be obtained in many different ways, for example with the locking mechanisms which are in any case provided or by means of a hook-shaped element which is provided on the lifting platform and engages with parts of the vehicle superstructure in the aforementioned pivoting region. The support can be constructed in a particularly simple manner as a stop abutment. Suitable parts of the lifting platform will then bear upon it. The construction is particularly simple if the stop abutment is formed on the side of the loading surface adjoining the lifting platform at a level corresponding to the edge of the lifting platform nearest to the vehicle superstructure in the vertical position of the platform. The edge of the lifting platform can then simply bear on the abutment. Pivoting causes the edge of the lifting platform automatically to leave the stop abutment after a specific pivoting angle of approximately 30° has been traversed. The dead weight and the lever arm relative to the centre of gravity will then also produce an adequate moment to apply the hydraulic differential force which keeps the lifting platform in the top position after it leaves the stop abutment until the lifting platform has reached its horizontal position.

A spring acting in a corresponding direction can act on the lifting platform so that the latter can be pivoted, without the application of manual force, from the closed position. After opening the tailgate locking hooks or the like and operating the control means for the opening operation, the spring will immediately pivot the lifting platform from the vertical position at least until the applied moment is sufficient. As the pivoting motion continues, the spring can also produce an assisting action to obtain an adequate hydraulic retaining force. For example, the spring, in the form of a torsion spring or coil spring, can act in the region of the pivoting axis. Since the guiding arms must either be constructed so that they can be extended or means must be provided to permit movement between a coupling element associated with the parallelogram system and support means for an arm fixed to the lifting platform, the spring can be allowed to act on the lower support elements of the lifting platform. In a particularly convenient arrangement, the spring is a tension spring which acts on the guiding arm. In a design of this kind, the guiding arm is conveniently constructed in known manner as a telescopic arm with a thrust-limiting stop. The tension spring can be disposed within the telescopic arm and can be attached to its two parts. The spring is then protectively housed in simple manner and does not obstruct other parts nor does it prevent the adoption of a narrow construction.

To load-relieve the vehicle superstructure, if the superstructure is provided with a loading device having hydraulic upwardly pivoting means but having insufficient stability to support the lifting platform in the vertical position, it is convenient to provide the telescopic arm with an extension stop which defines the vertical position of the lifting platform so that control can be effected by means of a pressure-relief valve.

The support system must be made as narrow as possible because of the attachment conditions which exist on different vehicles, taking into account the chassis parts to which the support means are to be attached, e.g. the suspension system, the wheel axle housing and the like. The support structure in its entirety must also be as light as possible so that the dead weight does not account for an excessive portion of the total vehicles weight at the expense of the payload. Bifurcated bearing systems or two-sided bearing systems for the hinged components, which most often transmit large forces, are therefore to be preferred to cantilevered hinged components. To obtain the necessary retaining forces from the moment resulting from the empty lifting platform weight and pivoting arm, the design of the lever arm frequently can vary only within narrow limits if the many other factors are taken into account. If support on both sides is nevertheless desired, it is still possible to obtain hinging in a plane which is advantageous in the most important regions, but without obstructing the joint for the hinge axis, namely by offsetting upwards the lifting-closing ram end adjoining the lifting platform. This results in a convexity which is situated at a short distance from the hinge point and passes around the pivoting shaft in the corresponding regions. The force and the mechanical strength conditions can be well controlled in this case without any substantial complexity.

Hinging means at the support end, and the direction in which the rams act, are important features, apart from the hinging means of the lifting ram and lifting-closing ram at the lifting platform end, if a favourable configuration of the loading device components is to be obtained in the region of the lifting platform and to ensure the advantageous application of forces which permit automatic retention of the lifting platform in the horizonal position. A ram hinging point situated as low as possible, but not too far outside the other components of the loading device, is advantageous. There are, however, numerous cases in which upward pivoting of the lifting platform into the vertical position is not necessary, not possible or not desired, or can in any case be achieved by other means. For example, if the lifting platform is not used as a tailgate, because the superstructure has a door, the said platform can conveniently be stowed beneath the loading surface between the lifting arm and the loading surface. Means for upward pivoting are then not required. Opening and closing of the wall with pressure means may in some circumstances be dispensed with in the case of lightweight walls and this operation is carried out manually, more particularly if only one ram is to be installed for reasons of design or cost. In other cases, the guide arms themselves are constructed as rams, for example if the vehicle is to be used in hilly terrain where the loading operation must frequently be performed on steeply inclined roads. Means are then necessary for setting the lifting platform in the horizontal position, even if the loading surface is inclined. Inter-alia this can be achieved very readily if a ram is provided in the guide arm on at least one side. Since such a ram in any case requires corresponding control devices, it can also be used for opening and closing the lifting platform to serve as a tailgate or side wall.

The kinematic conditions of a loading device of optimum construction, adapted to permit the outer end of the lifting platform to be inclined, are the same in all these cases. Such a tilting action is necessary in most vehicle-mounted loading devices, because, in order to achieve a stable parallelogram, the hinge axes in the region of the lifting platform must be arranged at a specific distance from each other and it is then no longer easy, without additional ramps, to drive wheeled containers on to and off the lifting platform. According to many different known proposals, the tilting action is achieved by extending one of the parallelogram arms in accordance with the toggle level principle. To this end, one arm is supported on a rocker or a support lever which in turn can pivot on a fixedly supported axis and bears on a fixedly supported stop abutment during the remaining phases of movement of the loading device. The above-mentioned toggle link can open only if the lifting platform bears on the roadway or the like or is supported in the position in which it is raised to the loading surface height to permit bridging to a ramp at a lower level. In the other phases, the system is arranged so that the applied forces keep the joint closed.

In known loading device structures which have a large support tube and in which a torsion and driving tube is rotatably supported in the support tube, it is not possible for the length of lever arm to be freely selected because these lengths are defined by design conditions and the mechanical strength requirements of the tubes. A ram enables a large number of movements to be simply obtained in such constructions. However, it has been found that in many cases the applied forces are unable automatically to keep the toggle joint closed, so that a construction of this kind cannot be used for specific wall dimensions or loading conditions. The known joints also suffer from the disadvantage that they open suddenly when a critical phase of movement is exceeded or a critical distance with a load is exceeded, thus causing the lifting platform to tilt even when this is not desirable. Unfortunately, such critical phases occur more frequently in the top position than in the bottom position in known systems. They are then particularly detrimental and dangerous, because the load will then slide from the inclined plane from a great height.

The previously-mentioned German Offenlegungsschrift No. 22 53 654 deals with different support lever systems which make use of support levers in which the hinge axis can be selected independently of the bearing systems. These hinge systems are however extremely unfavourable owing to their lack of stability resulting from the intermediate levers or have all hinge axes supported during lifting and lowering in one vertical plane at the support end. These hinging systems do not provide optimum conditions for variably usable support systems, because of the manner in which forces act, because of the position of the hinge axes, and more particularly with reference to avoiding undesirable opening of the toggle joint in critical phases and/or for critical lever arms and critical positions of the lifting and guiding arms in the region of the end positions.

In loading devices of this kind which, in addition to the previously-mentioned features common to all embodiments of the invention, have at least one ram which acts on the lifting arms and lifting platform and the hinge axis of which is situated beneath the plane formed by the hinge axes at the opposite ends of the lifting arms and in which the axes at the ends of the lifting arm and ram adjoining the support system are supported on a support lever which can rotate about a fixedly supported hinge axis disposed above the lifting arm hinge axis and can lift off of a fixedly supported stop abutment against which it is thrust for support purposes during lowering and raising of the platform and away from which it moves in the manner of a toggle lever system only for the purpose of lowering of the lifting platform end, it was found that exceptionally favourable retaining force and construction conditions can be achieved for a large number of applications if the fixedly supported hinge axes of the support lever and of the ram, in the stop abutment position of the support lever, are situated between the plane formed by the hinge axes at one end of the lifting and guiding arms, and the plane formed by the hinge axes of the other ends of the said arms. The last-mentioned planes are those in which the parallelogram arms are hinged when the end of the lifting platform is not lowered. It is mainly by displacing the hinge axis of the support lever from the aforementioned plane at the end adjoining the support system, in the direction towards the lifting platform, that the kinematic conditions can be changed, so that critical phases in which there is a risk of lifting off the stop abutment hardly occur in a loading device constructions suitable for most cases, even if the lifting and guiding arms are set relatively steeply when the lifting platform is in the top position. Lowering of the end of the lifting platform is almost always required in the bottom position of the lifting platform. It has been found that in this position, when the loading device bears on the ground, lowering of the end of the lifting platform with the above-mentioned hinging of the pivoting lever and of the lifting and guiding arms, proceeds rapidly, smoothly, simply and reliably. The risk of critical phases in which the support lever lifts off the stop abutment prior to setting down occurs only in the case of very long lifting platforms and only in the bottom range of movement. Under these conditions such premature tilting would not be detrimental, because the distance between the load and the ground is small. In practice, such critical phases do not occur with length of lifting platform normally employed. However, should the toggle joint open, due to an unfavourable mode of attachment and/or due to an unfavourable length of the lifting platform, this will occur not suddenly but progressively in the course of the movement, and the user who is actuating the operating button (usually beside the loading device) will notice this effect and can return the lifting platform to a more stable position by movement in the other direction.

The practical requirements made on the loading device as regards lifting platform length, arm length, position of the support, the steepest angle of the lifting and guiding arms and the like do not permit the design of a supporting element structure in which the individual hinge axes have the position corresponding accurately to the geometrical conditions in all cases of use, so that mass production of identical basic elements was hitherto more difficult than is possible in accordance with the invention. The device according to the invention represents an advantageous compromise for a very large number of cases, taking into account the different geometrical factors for the constructive design of a loading device which has the same parts but can be employed in many different ways. The compromise with optimum conditions found in this case for a wide range of uses contains the idea of locating the position of the hinge axis in such a way that critical conditions regarding the risk of the support lever lifting off its stop abutment in the upper regions of the lifting platform position can occur only for a very long platform, while such critical conditions can occur in lower positions with shorter lifting platforms. This is achieved by unequal pivoting conditions and lever arms in the regions above the horizontal position of the parallelogram arms and beneath the horizontal position of the parallelogram arms because the hinge axis of the support lever is displaced. This lack of symmetry has an advantageous effect, because the lifting and guiding arms are set much steeper in the top position of the lifting platform than in the bottom position of the lifting platform for many given uses of the loading device. If the critical vertical plane were actually to be crossed in the bottom position of the loading platform by the line along which the force resulting from the load weight acts, this would be readily detected during the lifting operation by incipient tilting and the loading conditions can thus be altered at an early stage.

According to a further aspect of the invention, the angle between the plane formed by the hinge axes of the lifting and guiding arms at the ends adjoining the support system and the plane defined by the hinge axis of the lifting arms at their support system ends and the fixedly supported hinge axis of the support lever should be smaller in the abutment position of the support lever than the angle between the plane formed by the lifting arm axis and the plane formed by the hinge axis of the lifting and guiding arms at their support system ends, in the steepest position of the lifting arms, in which the lifting platform or its top hinge axis is situated in the topmost position. Despite optimum moment conditions on the hinge axis of the support lever this ensures that lowering of the end of the lifting platform is possible in the topmost position of the platform. This also results in favourable arm lengths and tilting distances, i.e. an advantageous extension of the lifting arm when the end of the loading platform is tilted in the bottom-most position. It also avoids the risk of the toggle lever reaching its stretched position. Furthermore, a relatively short ram will be sufficient.

It is convenient for the hinge axis of the ram to be situated, in the stop abutment position of the support lever, beneath the hinge axis of the guide arm. This results in an advantageous operating direction of the ram and advantageous ram cylinder dimensions. The hinge axis of the ram can be arranged not only so that it is disposed beneath the level of the hinge axis, but also always outside the parallelogram area which is defined by the lifting and guide arms. The conditions under which the forces act over the entire working range are thus further improved. It also results in more advantageous conditions as regards the change of length and of the amount of lift on the ram between the two positions on the roadway.

Advantageously, the suport lever stop abutment is placed on the support tube side opposite the fixedly supported hinge axis of the support lever, more particularly directly adjacent to said tube. This leads to the largest possible lever arm with a resultant low supporting force and surface pressures but with the other conditions remaining unchanged and more particularly offers the means of obtaining an enclosed shape for the support lever and bearing arm link and for the support lever stop abutment.

By optimizing the loading device construction, more particularly by advantageous choice of hinge axes in the region of the top and bottom ends of the lifting and guiding arms, it becomes possible according to the invention to assemble the most diverse loading devices from the least possible number of different and as far as possible identical components in a system of combinations so that a loading device construction corresponding to prevailing requirements is made available without the need for special components to be individually manufactured. The components listed below can therefore be extremely efficiently mass-produced in relatively large numbers and can be readily kept in stock. These components are of, course, completed by further components such as mounting means, control devices and the like, which are, however, aslo standardized or mass-produced components. According the invention, it is particularly the following elements which are provided: a support system for attaching the loading device fixedly to the vehicle or to the superstructure with a fixedly supported hinge axis situated behind and above a support lever stop abutment; support levers whose fixedly supported hinge axes in the stop abutment position are situated between and planes formed by the hinge axes at the respective ends of the lifting and guiding arms; lifting arms of the equal length with a bifurcated head the upper end of which is upwardly offset and supports the bore for the top hinge of the lifting platform and a bore at the beginning of the offset portion for the optional hinging of the lifting ram; optionally usable guide arms either in the form of extensible telescopes with thrust abutments or in the form of rams; optionally usable lifting rams, and lifting and closing rams provided with an extension head that reaches through the bifurcated head to the hinging arm on the lifting platform; at least one ram whose hinge axis adjoining the support system is situated on the support lever, in the stop abutment position thereof, beneath the level of the hinge axis of the guide arms on the support system; a lifting platform hinging system with two hinging bores situated one above the other in the horizontal position of the lifting platform, for the lifting and guiding arms, and with a hinging bore situated therebetween on at least one side for the lifting and closing ram.

These principal components, which can readily be dimensioned for the most diverse loading conditions and can be arranged advantageously relative to each other, can be employed for lifting platforms constructed in the most diverse kind and size and can be kept in stock by the vehicle dealer, the assembly shop or manufacturer so that the required loading device can be prepared and installed at very short notice.

With the construction of the loading device according to the invention, the rams used as lifting rams or as lifting and closing rams can be single-acting. Accordingly, the control system can be arranged simply and at moderate cost and the rams are also moderately priced. With this embodiment according to the invention, it is even possible for the lifting ram and the lifting-closing ram to have identical piston and cylinder sizes, a feature which is advantageous for stock-keeping and for the unit construction system as well as for producing the automatic horizontal retaining force. The system is so arranged that the lifting ram and lifting-closing ram can be the same lengths of stroke, thus achieving a further simplification of manufacture and stockkeeping. When used as a lifting-closing ram, it is then possible to provide an exchange head which increases the hinging distance if it is not desired to use a longer piston. The said exchange head is conveniently offset in the upward direction so as to achieve a bifurcated support on both sides together with the feature of curving around the main hinging means.

The lifting platform end of the lifting arm, and preferably also the end nearest to the support system is provided with a bifurcated head. This permits nesting of bearing plates, bearing pins and/or support levers in a particular advantageous manner. Cantilevered bearings are avoided and a very narrow stable construction is obtained combined with symmetrically acting forces. The bifurcated head of the lifting arm has a hinge bore for the lifting platform and advantageously also a lifting unit hinge bore on which the lifting ram can be optionally hinged. This bore need not be provided if a lifting-closing ram is employed, but it does not interfere so that only a single lifting arm type need be manufactured and stocked despite the possibility given by the invention of using two rams to obtain a stable construction which permits hydraulic closing of a vehicle tailgate. The lifting ram is supported on both sides in the bifurcated head. The lifting platform end of the lifting arm is conveniently constructed so that it is offset in the upward direction. The hinge axis of the lifting platform can therefore be brought very close to the end of the loading surface and only a very narrow gap is obtained between the lifting platform and the loading surface even if additional reinforcement or stop abutment parts are provided at the end of the loading surface.

Conveniently, the lifting arm is constructed in known manner in U-shaped or L-shaped cross-section. It can have a high degree of stability combined with a thin-walled section, and it can protect parts situated below and advantageously permit twosided support. Conventionally, the lifting arms are interconnected by a stiffening tube to absorb torsional forces or to eliminate mutual twisting. The construction according to the invention enables the connecting tube to be situated at a place which is advantageous in terms of stresses and where, despite its size, movement is not obstructed and the construction can even readily support means for protection of the undercarriage without impairing the movability. Advantageously, the U-section or L-section is arranged with its open side facing downward. The connecting tube can be readily accommodated and mounted, particularly if the arm section has an inner flange which broadens in the direction towards the support. Conveniently the lifting or the lifting-closing ram is arranged beneath the lifting arm. The ram will then be protected and be situated partially in the lifting arm or can at least move into the same, so that the construction becomes exceptionally narrow. The ram will then advantageously engage the bifurcated head from below because it can then be arranged to act in advantageous directions, more particularly the lifting-closing ram can act through the bifurcated head on the lifting platform while all components are reliably and stably hinged. This multiple bifurcated arrangement does not restrict the choice of position of the various hinge axes to the same extent as in some other solutions to the problem of this constructions. The bifurcated head construction also offers advantageous conditions in terms of mechanical strength and as regards the transfer of compressive, tensile and bending forces.

Advantageously, the guide arms are arranged so that they are situated outside the lifting arms. The stiffening tube can thus be very low and the offset heads do not obstruct the movement of the guide arms. A relatively narrow arm construction and support on both ends can nevertheless be obtained.

BRIEF DESCRIPTION OF DRAWINGS

Further features of the invention will appear from the following description with reference to the accompanying drawings which show by way of example preferred embodiments of the invention. In the drawings:

FIG. 14 is a diagrammatic side view of the loading device corresponding to FIG. 13, with the lifting platform in closed position as a tailgate.

DESCRIPTION OF PREFERRED EMBODIMENTS

Figure 1:
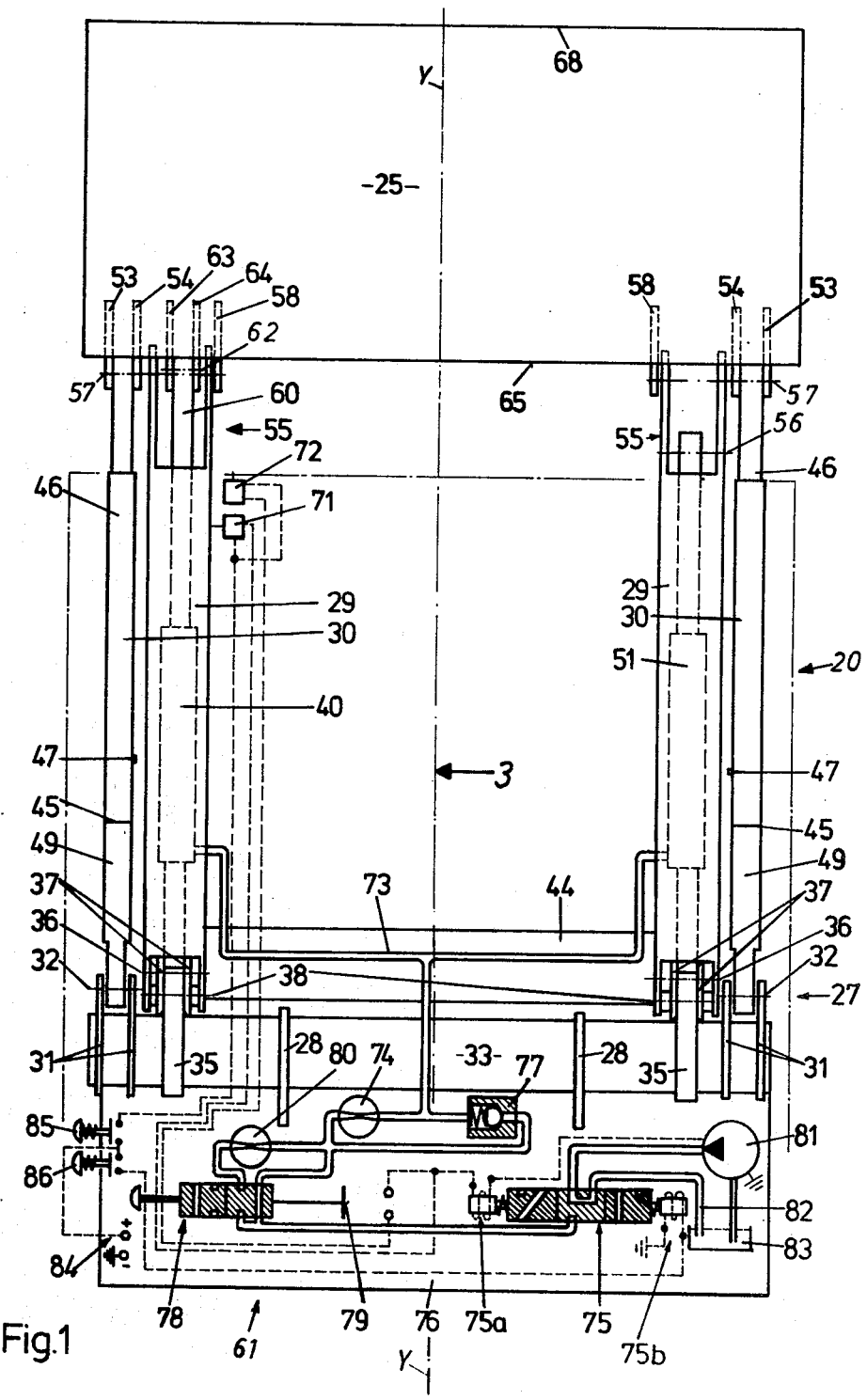
FIG. 1 is a plan view of the loading device in accordance with the invention with its lifting platform in a position between the loading surface and roadway, the control means for the loading device being shown in partially diagrammatic form.

In FIGS. 1 to 11 of the drawings, the loading device 20, shows as comprising a support system 27, lifting arms 29 guiding arms, 30, hydraulic means 40, 51, a lifting platform 25, and an electro-hydraulic control device 61.

In the illustrated embodiments, the loading device 20 is mounted at the rear end of a goods vehicle 21 symmetrically with respect to the longitudinal vehicle axis Y-Y. Only parts of the side wall 22, the loading surface 23, the chassis 24 and the rear wheel 70 of the goods vehicle 21 are shown. To load and unload the goods vehicle 21, the lifting platform 25 moves between the loading surface 23 and the roadway 26.

FIG. 1 is a plan view of the entire loading device 20 in which the lifting platform 25 is situated in a position between the loading surface and the roadway. The parts of the goods vehicle 21 is situated above the plane of the drawing are indicated by dash-dot lines.

Figure 2:
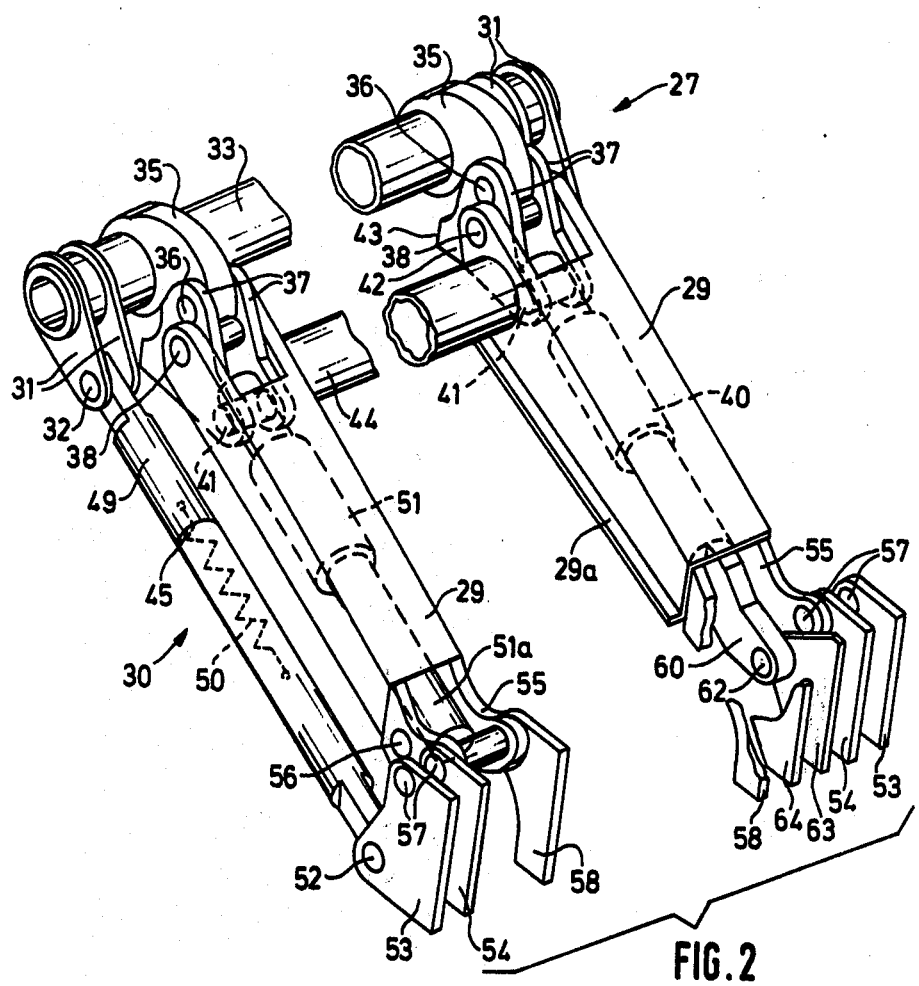
FIG. 2 is a perspective view of part of the loading device according to FIG. 1 in the position lowered onto the roadway.

The support system 27 of the loading device 20 is mounted by means of two lugs 28 on the chasis 24 beneath the latter. FIG. 2 shows details of the support system 27 in perspective in the lowest position of the platform 25 viz. on the roadway, the rear end of the lifting platform being downwardly inclined. Parts of the control system and of the goods vehicle, as well as the lugs 28 and the lifting platform 25, are not shown.

Figure 8:
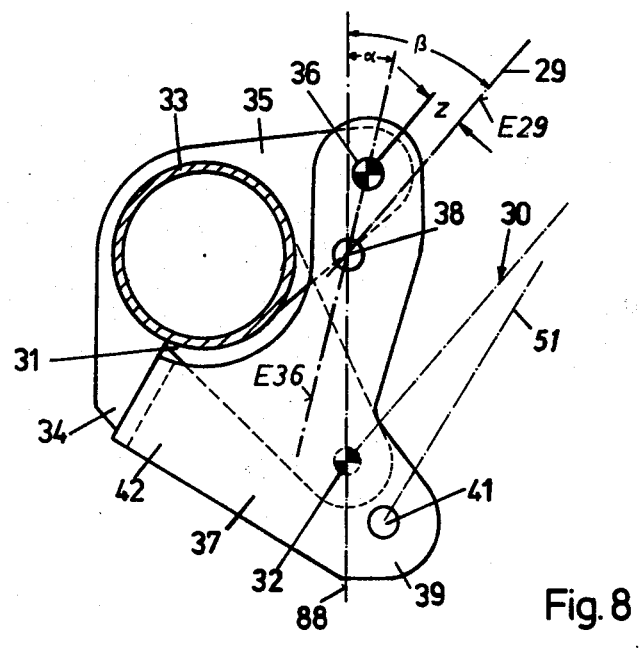
FIG. 8 shows an enlarged diagrammatic partial side view of the support system according to FIG. 3 in the loading surface position of the lifting platform.
Figure 9:
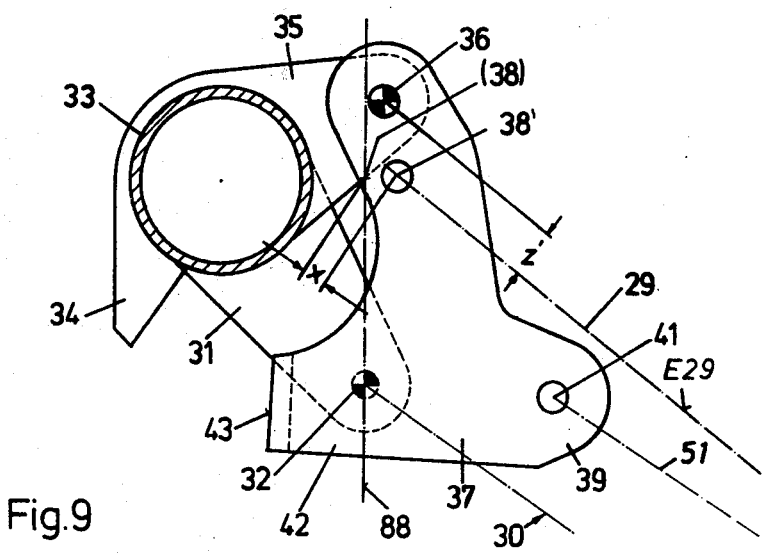
FIG. 9 shows a side view similar to FIG. 8, in the bottom position and with the rear end of the lifting platform lowered onto the roadway as in FIG. 6.

The support system 27 is provided with a carrier tube 33 which is supported by the lugs 28. Two bearing arms 31, through which the fixedly supported hinge pin 32 of a guide arm 30 extends and which are inclined downwardly at an angle in the direction of the lifting platform 25, are mounted at each end of the carrier tube 33. Directly adjacent to each pair of arms 31 and offset from the longitudinal axis of the vehicle there is provided a bearing arm 35, which extends obliquely upwards and in the direction towards the lifting platform and is embraced in bifurcated manner at its top end by a two-part support lever 37. The lever 37 is pivotably supported on the bearing arm 35 by means of a hinge pin 36 which is parallel to the carrier tube 33 and is supported by the bearing arm 35. The lever 37 has a shape corresponding approximately to that of an inverted T and its main part extends below the hinge pin 36. It is provided with a cylinder-hinging part 39 which points obliquely downwards towards the lifting platform and has a strongly constructed support member 42 which terminates in a stop abutment surface 43. From the latter, a partial circular contour extends as far as the hinging part, so that the support lever is able to curve around the carrier tube 33 as seen in FIG. 8. The stop abutment surface 43 is formed as a cross-connection between the two support lever parts. In the stop abutment position illustrated in FIG. 8 it bears upon the support lever stop abutment 34. The latter is formed as an extension of the bearing arm 35 on a common and strong support member which is connected to the carrier tube 33, preferably by welding.

FIG. 8 is a partial side view in which only the support lever 37, the carrier tube 33, the bearing arm 35, the stop abutment 34 and a bearing arm 31 are fully shown, while the hinged components are illustrated only be means of their centre lines. The bearing arm 31 is fixed on the carrier tube 33 and is provided with a hinge pin 32 on which the guide arm 30 is hinged. The hinge pin 36 of the support lever 37 as well as the hinge pin 32 of the guide arm 30 are fixed with respect to the vehicle or the superstructure and are marked by two oppositely disposed quartercircle parts being blackened. The support lever 37 carries a hinge pin 38 for the lifting arm 2a and a hinge pin 41 for the hydraulic means 40, 51. As can be seen in FIG. 8, the centre lines of the lifting arm 29, the guide arm 30 and the hydraulic means 40, 51 point upwards and this view corresponds to the topmost position which the loading device is able to reach.

The hinge pin 38 for the lifting arm 29 is provided in a corresponding bore on the lever 37 beneath the pin 36. In the stop abutment position of the lever 37, as shown in FIG. 8, the pin 38 is situated precisely above the fixedly supported pin 32 for the guide arm 30 so that the two pins 32 and 38 define the vertical plane 88 of the hinge axes of the supported ends of the lifting arm 29 and the guide arm 30. As can be seen in FIG. 8, the relative position of the support lever hinge pin 36 and the plane 88 is selected so that the angle α formed between the plane 88 and a plane E36 extending through the axes of the pins 38 and 36 is smaller than the angle β between the plane 88 and the plane E29 extending through the axis of pin 38 and defined by the centre line of the lifting arm 29 in the topmost loading surface position. The hinge axis of the hinge pin 57 of the lifting arm at the lifting platform end (FIG. 3) is situated above the plane defined by the centre line of arm 29. As can be seen by reference to FIG. 2, the bifurcated forward end of the lifting arm 29 is hinged to the pin 38 so that it embraces the two-part support lever 37 on both sides.

The forward hinge pin 41 for the hydraulic piston-cylinder unit 40, 51 is located in a lower portion 39 of the lever 37 and is parallel with the carrier tube 33. The pin 41 is situated not only beneath the hinge pin 38 of lifting arm 29, but also beneath the level of the fixedly support hinge pin 32 of the guide arm 30 and, like the hinge pin 36, it is offset in the direction towards the lifting platform, i.e. to the right of the plane 88 in FIG. 8, but its distance from the plane 88 is greater than the distance from the plane 88 to the support lever hinge pin 36.

Figure 3:
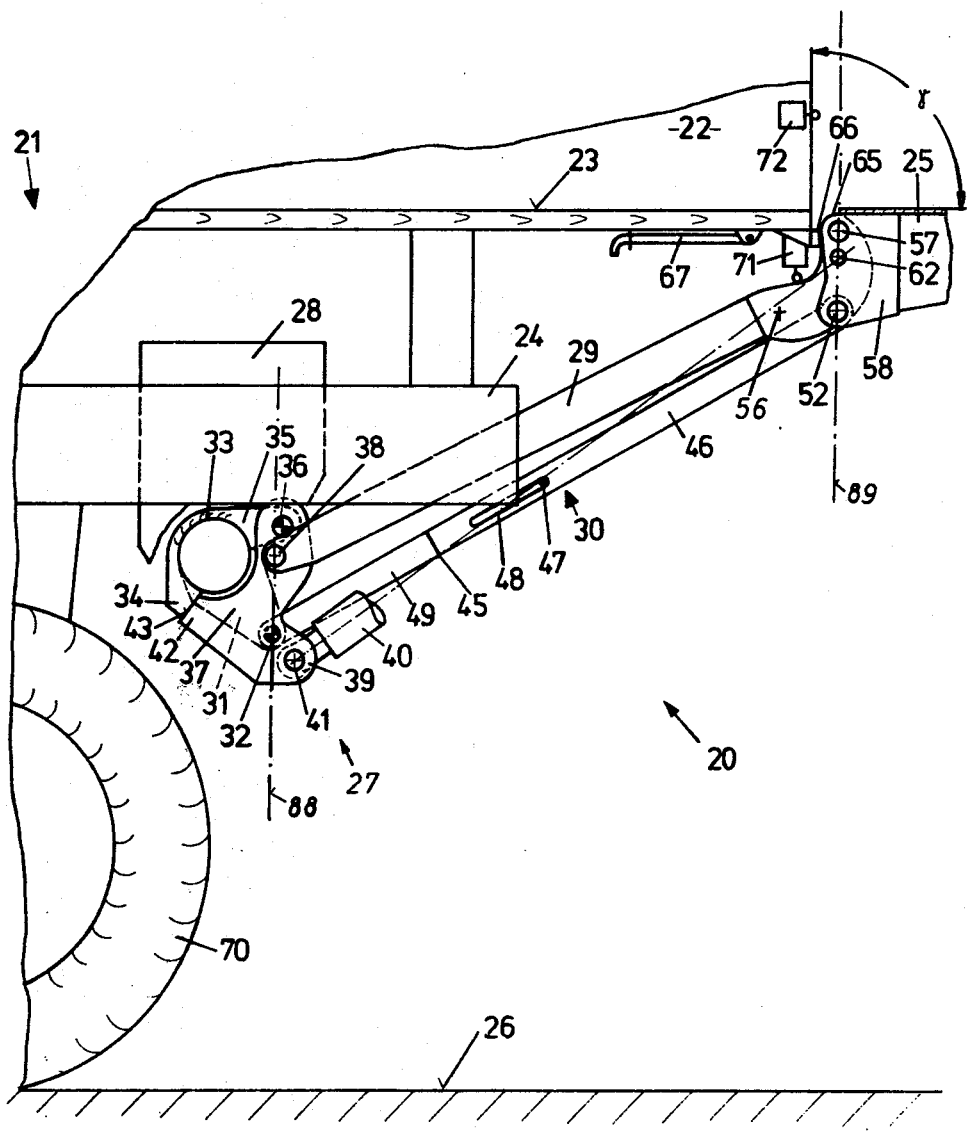
FIG. 3 is a diagrammatic side view taken from the longitudinal axis Y-Y of the vehicle in the direction of the arrow 3 in FIG. 1, the lifting platform being shown in the loading surface position.
Figure 4:
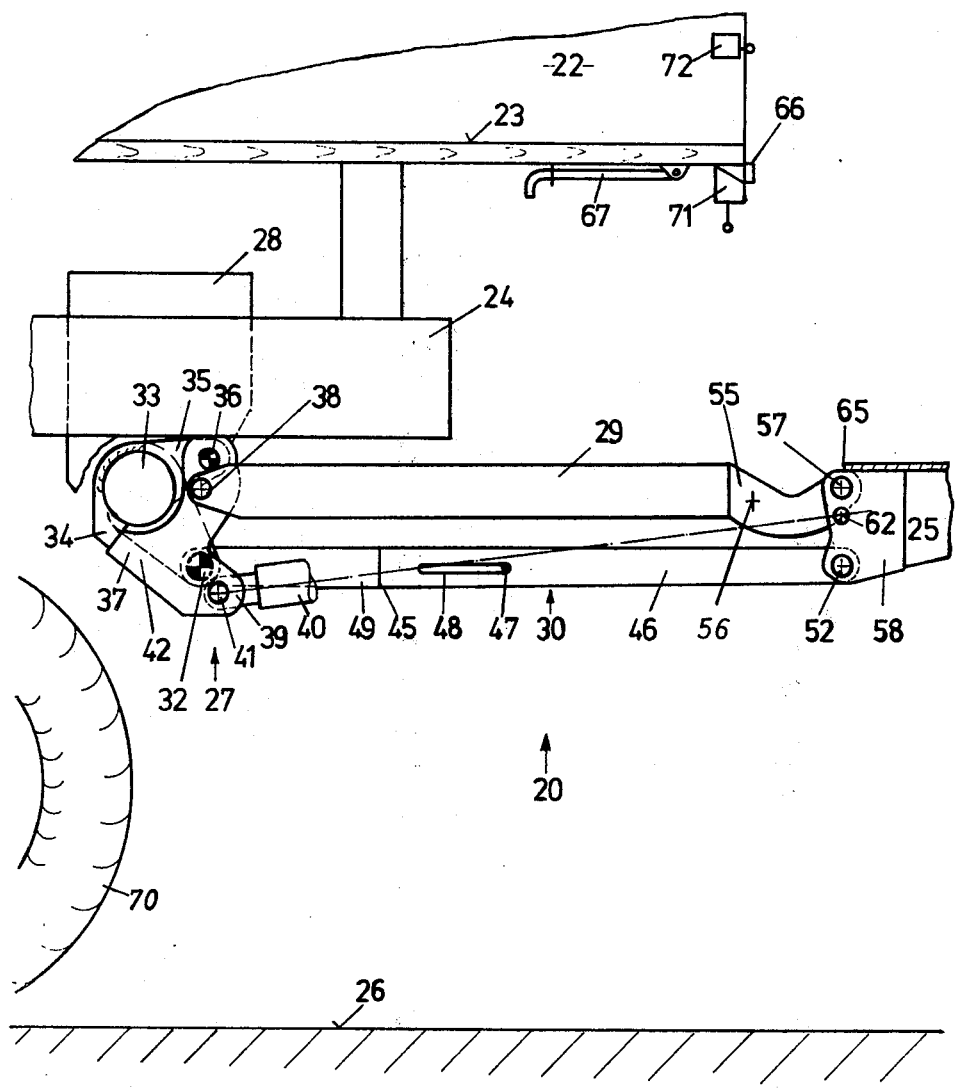
FIG. 4 is a diagrammatic side view corresponding to FIG. 3 showing the lifting platform at the height of the support system, approximately in the position shown in FIG. 1.

The guide arm 30 which pivots on the pin 32 is constructed as a telescopic arm with a thrust-limiting stop abutment 45 (FIG. 2). Its components 46 and 49 are constructed as tubular sections which partially telescope one into the other. Each of these parts is attached to a respective end of a tension spring 50 situated within the said parts. Between the two parts 46 and 49 there is an extension-limiting device comprising a stop abutment 47 provided on the part 49 that is hinged to the arm 31, and engaged in a slot 48 in the part 46 which can move outwardly (FIG. 3). The part 46 is pivotably mounted on the lifting platform between a support plate 55 and a coupling plate 54 by means of a hinge pin 52 which is also parallel with the carrier tube 33.

The lifting arm 29 is formed as a U-shaped section the flange lengths of which differ in part and which is opened at the bottom and has a stiffening edge flange 29a integrally formed at its bottom edge and pointing towards the other lifting arm. The height of the side flanges of the U-section varies in such a way that the side flange which faces the other lifting arm increases in height in the direction towards the carrier tube. This shape of the side flange, representing a trapezium in side view, is shown only in the perspective of view of FIG. 2 and has been omitted in the other illustrations in order to avoid overlapping and lack of clarity. A stiffening tube 44, the diameter of which is of the same order of magnitude of that of the carrier tube 33 is attached, preferably by welding, between the two trapezoidal inner surfaces of the lifting arms 29 near the hinge pins 38. This can serve as mounting means for an undercarriage protection means (not shown) adapted to move with the lifting arms 29. The lifting platform end 55 of the lifting arm 29 is bifurcated like its forward end but is upwardly offset, and acts between the coupling plate 54 and a support plate 58 of the lifting platform on a hinge pin 57 parallel with the carrier tube 33.

To raise and lower the lifting platform and to pivot it into the vertical position to enable it to function as a tailgate, only the two single-acting hydraulic rams 40, 51 are provided in this first embodiment of the invention. These hydraulic rams are situated beneath the lifting arms 29 and have an external diameter smaller than the internal distance between the side flanges of the lifting arm U-section, so that they are able to move therein. Each is pivotably supported on the respective support lever 37 by means of a pin 41.

The lifting ram 51 shown on the left of FIG. 2 extends, at its lifting platform end 51a, from below into the downwardly open cross-section of the lifting arm 29, and is connected to a hinge pin 56 which, like all other pivoting axes, is parallel to the carrier tube 33. The hinge pin 56 is supported approximately at the beginning of an offset portion of the bifurcated rear end 55 of the lifting arm to provide a pivoting joint between the lifting arm and the ram. In FIGS. 3 to 11, the pin 56 is illustrated only by crosses because the lifting ram is situated in front of the plane of the drawing.

The lifting and closing ram 40, situated in the lifting arm on the right in FIG. 2, has the same piston and cylinder size and the same length of stroke as the lifting arm 51. However, at its lifting platform end, it has an interchangeable head 60 which increases the hinging distance, is upwardly offset, and projects from below into the bifurcated end 55 of the lifting arm 29, and is pivotally connected by means of a hinge pin 62 between support plates 63 and 64 which are mounted on the lifting platform in addition to the plates 53, 54, 58.

The distance the pin 62 and the pivoting axis of the lifting platform 25, which coincides with the hinge pin 57 in the exemplified embodiment, must be selected with due reference to several factors. The requirement for rams which are as far as possible identical and for pivoting-closing angles γ (FIG. 3) which are normally 90° are co-determining. However, the said distance is also involved in the magnitude of the moment which results from the dead weight of the pivoted platform and defines the horizontal retaining force. The offset configuration of the interchangeable head 60 on the one hand permits it to clear the pin 57 for pivoting the lifting platform into the vertical position and on the other hand it corresponds to the position of the pin 56 of the lifting ram 51 in the bifurcated end 55 of the lifting arm 29 to the extent that the line of action of the forces exerted by the lifting and closing ram 40 is situated as closely as possible within a narrow region close to the plane formed by the axes of pins 41 and 56 while the lifting platform 25 is raised and lowered. This arrangement substantially counters the creation of torsional forces between the lifting arms 29 and guide arms 30 which are disposed in parallelgram configuration on both sides of the longitudinal axis Y-Y of the vehicle.

A stop abutment edge 65, which bears on a stop abutment 66 attached at a corresponding height on the rear end of the locading surface 23 when the lifting platform is in the closed position, is situated on the lifting platform 25. A locking device 67 which can extend beneath the hinge pin 52 when the lifting platform 25 is in the loading surface position and which permits the lifting platform rear end to tilt down onto a ramp 69, situated at a lower level (FIG. 7), is also provided beneath the loading surface 23. The lifting platform end 68 is tilted down by the effective length of the lifting arm 29 being lengthened through downward pivoting of the support lever 37 from the support lever stop 34 about its hinge pin 36, which is fixed with respect to the chassis, in the manner of a toggle lever.

On the same side as the lifting and closing ram 40 and at the height of the loading surface 23, there is provided an electric lift limit switch 71 which is actuated by the lifting arm 29 when the loading surface position is reached (FIG. 3). A closing limit switch 72, which is actuated by the lifting platform 25 when it reaches the closed tailgate position, is provided at the rear end of the side wall 22. The limit switch 72 could also be a pressure switch and could be disposed in the hydraulic control line 73 (FIG. 1).

The electro-hydraulic control device 61 for lifting, lowering, closing and opening of the lifting platform 25, is shown only in FIG. 1, and there only partially and diagrammatically.

The lifting ram 51 and the lifting and closing ram 40 are connected to a common pressure medium duct 73 which is connected to the ram cylinders and is connected by means of movable ducts to the bearing system. The said duct extends by way of a common restrictor 74 to a common solenoid-operated control valve 75, mounted on a support plate 76 which in turn is mounted beneath the chassis part 24 on the bearing system 27, preferably on the carrier tube 33.

The valve member of the control valve 75 can be pulled into a left-hand position from the illustrated middle inoperative position to establish hydraulic communication between the pressure medium pump 81 and a manual control valve 78. In the right-hand position, the delivery connection of the pressure medium pump 81 is blocked and the return line 82 is connected to valve 78. A check valve 77 is provided in parallel with the restrictor 74. An additional restrictor 80 can be connected into the hydraulic circuit by the control valve 78, for the operations of closing and opening the lifting platform. The control valve 78 actuates a control switch 79 which bridges the lift limit switch 71 via the closing limit switch 72 when the valve member of valve 78 is moved to the right whereby the additional restrictor 80 is brought into operation. The pump 81 delivers hydraulic pressure medium from the reservoir 83, into which the return duct 82 extends.

The electrical conductors in the control diagram are illustrated by broken lines in FIG. 1. A current source 84 supplies direct current. As in most motor vehicles, the negative terminal is conductively connected to metal chassis parts, and it is connected to one terminal of the pressure medium pump 81 and one terminal of the right-hand energizing winding 75b of the control valve 75 by the means by which these components are mounted on the support plate 76.

The circuit extending to the positive terminal of the source 84 is closed for lifting and closing the lifting and closing the lifting platform 25, by the "Lift" push switch 85 in cooperation with the lift limit switch 71, and the closing limit switch 72 and the control switch 79, the left-hand energizing winding 75a of the control valve 75 and the pressure medium pump 81. For opening and lowering the lifting platform 25, the electrical circuit is completed by the "Lower" push switch 86 through the right-hand energizing winding 75b of the control valve 75. Other components of the control system are provided in the manner which is familiar to the expert.

Figure 5:
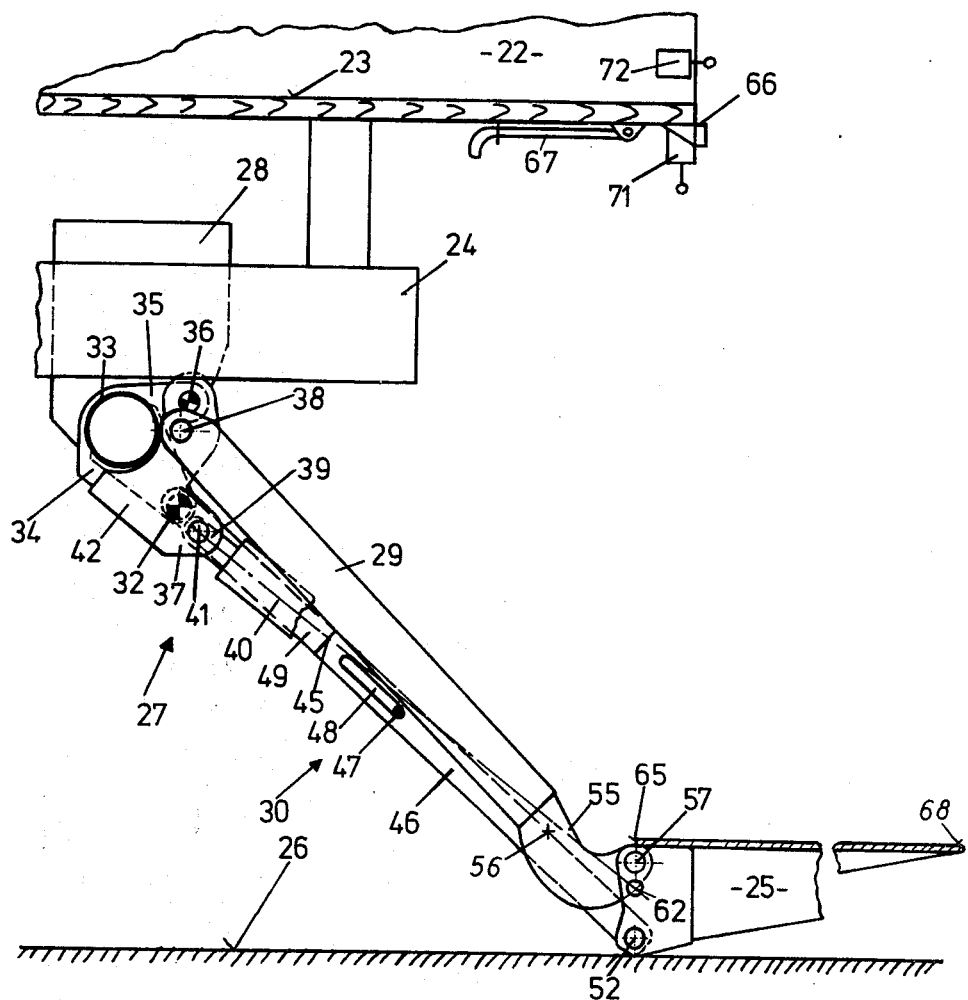
FIG. 5 is a diagrammatic side view corresponding to FIG. 3, with the lifting platform lowered to the roadway.
Figure 6:
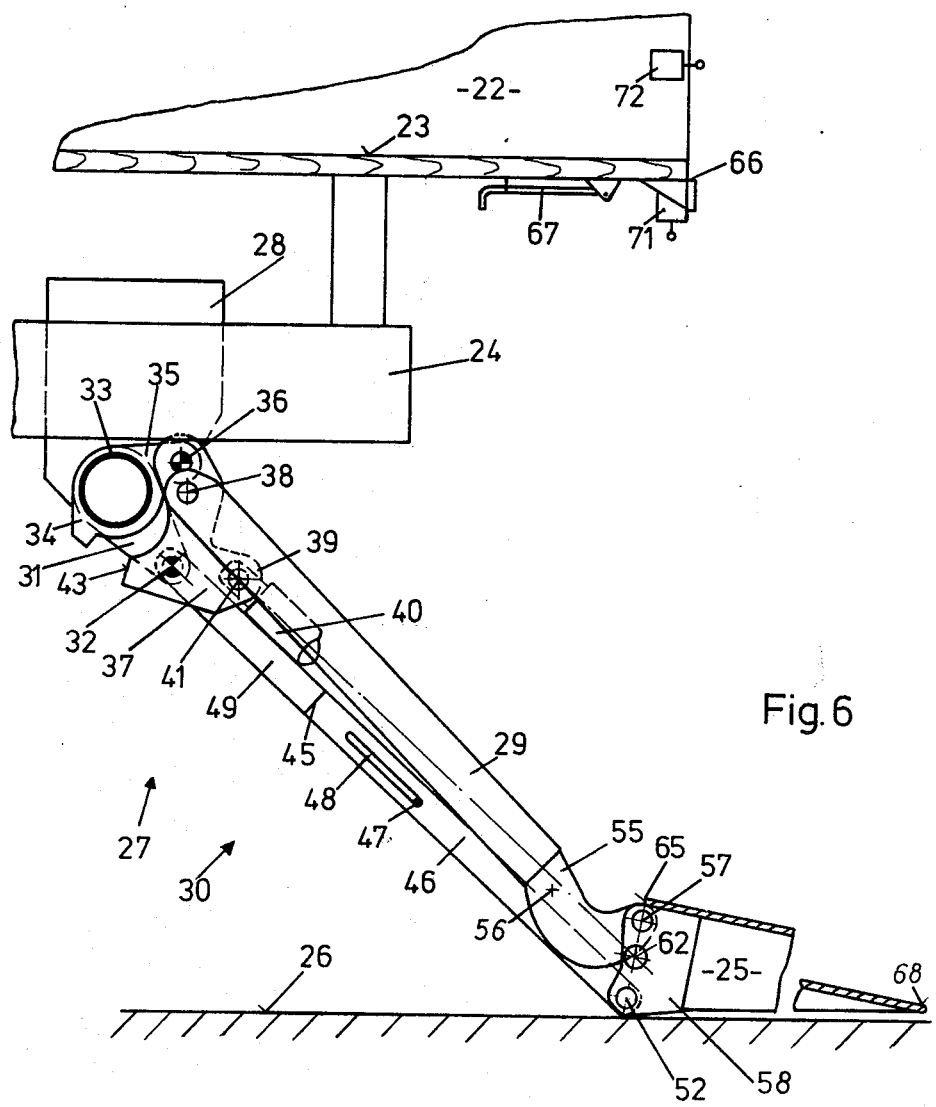
FIG. 6 is a diagrammatic side view similar to FIG. 5 with the rear end of the lifting platform lowered.
Figure 7:
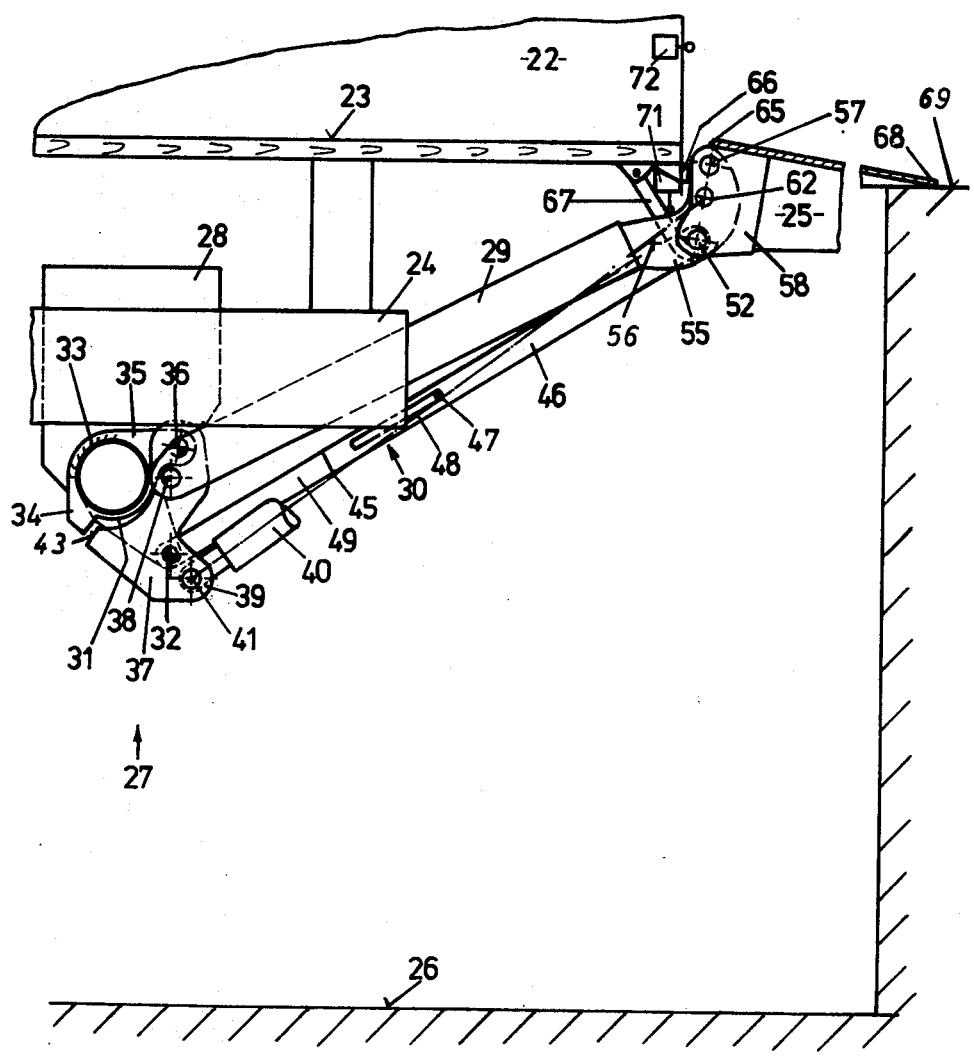
FIG. 7 is a diagrammatic side view of the loading device, in which the lifting platform is situated at the level of the loading surface but with its rear end downwardly inclined to a lower ramp.

The operation of this first embodiment of a loading device according to the invention will now be explained by reference to FIGS. 1 to 11. In FIG. 3 the lifting platform 25 is situated level with the loading surface 23. In this loading surface position, the support lever 37 bears by means of its stop abutment surface 43 on the stop abutment 34 and the outwardly movable part 46 of the guide arm 30 bears on the pressure-limiting stop abutment 45. The locking device 67 is not engaged. The "Lift" switch 85 and the "Lower" switch 86 are open. To lower the lifting platform 25 from the loading surface position, the control valve 78 is first set into the position shown in FIG. 1 in which the pressure medium can flow only through the common restrictor 74. Thereafter, by operating the "Lower" switch 86, the right-hand energizing winding 75b of the control valve 75 is energized and the valve member of the control valve 75 is drawn into the right-hand position, so that pressure medium is able to escape from the hydraulic rams 40, 51 through the common duct 73, the common restrictor 74, the control valve 78 and the return duct 82, into the reservoir 83. The lifting platform 25 will then move through the position shown in FIG. 4 at the height of the bearing system 27 into the position on the roadway 26, as shown in FIG. 5. To lower the rear end of the lifting platform end 68, if necessary for loading or unloading the lifting platform 25, the support levers 37 are released from the stop abutments 34 under the action of the dead weight of the lifting platform 25, and any load of disposed thereon, and in the course of the pivoting motion about the fixedly supported hinge pins 36, the effective length of the lifting arms 29 is increased by the distance X shown in FIG. 9.

To permit rapid downward tilting of the rear end 68 of the lifting platform after the lifting platform 25 has reached the roadway, the distance between the axis of pin 38 and the axis of pin 36 of the support lever 37 is made sufficiently large so that the support lever 37 can lift rapidly off of the stop abutment 34 under the pull due to the dead weight and inertia of the lifting platform, so that the lifting platform end 68 can tilt downwardly.

In the downwardly tilted position, it is important that the axis of the hinge pin 41 on the support lever 37 be beneath the plane defined by the axes of pins 38 and 57, so that the ram can move the lifting platform from the tilted position into the horizontal position by reverse pivoting of the support lever 37 against the stop abutment 34. The other hinging conditions of the parallelogram arms on the support lever 37 and the position of the hinge pin 36 with respect to the normally vertical parallelogram hinging plane 88 are significant in terms of obtaining advantageous conditions when the rear end of the lifting platform is downwardly tilted and reraised, since according to the invention the said position is displaced from this plane and is therefore selected so that optimum conditions for advantageous lever arms over which the forces act are obtained for practical pivoting angles, distances of the hinging points from the lifting and guide arms one above the other, and for the platform sizes. The position according to the invention of the hinging axes offers the advantage that rams with a relatively short stroke can be employed even for relatively large tilting angles of the rear end of the lifting platform in a position close to the roadway.

To raise the tilted platform 25, the switch 85 is actuated, as a result of which the left-hand energizing winding 75a of the control valve 75 is energized and pulls the valve member of the control valve 75 into the left-hand position. At the same time, the pressure medium pump 81 is energized to deliver pressure medium from the reservoir 83 through the control valve 78 into its illustrated position and through the check valve 77 into the duct 73 to pressurize the hydraulic rams. The result of outward movement of the piston rods is that the stop abutment surface 43 of each support lever 37 bears upon the support lever stop abutment 34 and the lifting platform initially assumes the horizontal position shown in FIG. 5. Further pressurization of the pistoncylinder units causes the lifting platform 25 to rise from this bottom position through the position illustrated in FIG. 4 to a position level with the loading surface 23, as illustrated in FIG. 3. When this position is reached, the lift-limiting switch 71 is actuated by the lifting arm 29. The supply of current to the control valve 75 and to the pressure medium pump 81 is thereby interrupted. To raise the platform 25 into its closed position, the control valve is then set into its other or "slow" position, in which fluid flow can only take place through the restrictor 80, whereby the lift-limiting switch 71 is bridged by means of the control switch 79 coupled to the valve 78, so that the valve member of the control valve 75 is again drawn into its left-hand position and the pressure medium pump 81 is simultaneously energized when the lift push-button 85 is actuated. Pressure medium will then be pumped through the restrictor 80 and through the check valve 77 into the duct 73 to pressurize both rams. Since the reaction force which acts on the lifting and closing ram 40 is less than that acting on the lifting ram 51, which bears immovably on the loading surface, it follows that the piston rod of the ram 40 with the interchangeable head 60 continues to be extended, slowly because the supplementary restrictor 80 is connected into the circuit, and thus slowly pivots the lifting platform 25 about the pin 57 until the closing limit switch 72 interrupts the power supply to the control valve 75 and the pump 81. The stop abutment edge 65 of the lifting platform 25 will have gradually moved over the stop abutment 66 over the last third of its travel, so that it then bears upon the stop abutment 66 and prevents lowering of the vertically positioned lifting platform, even when the return motion is engaged.

Figure 10:
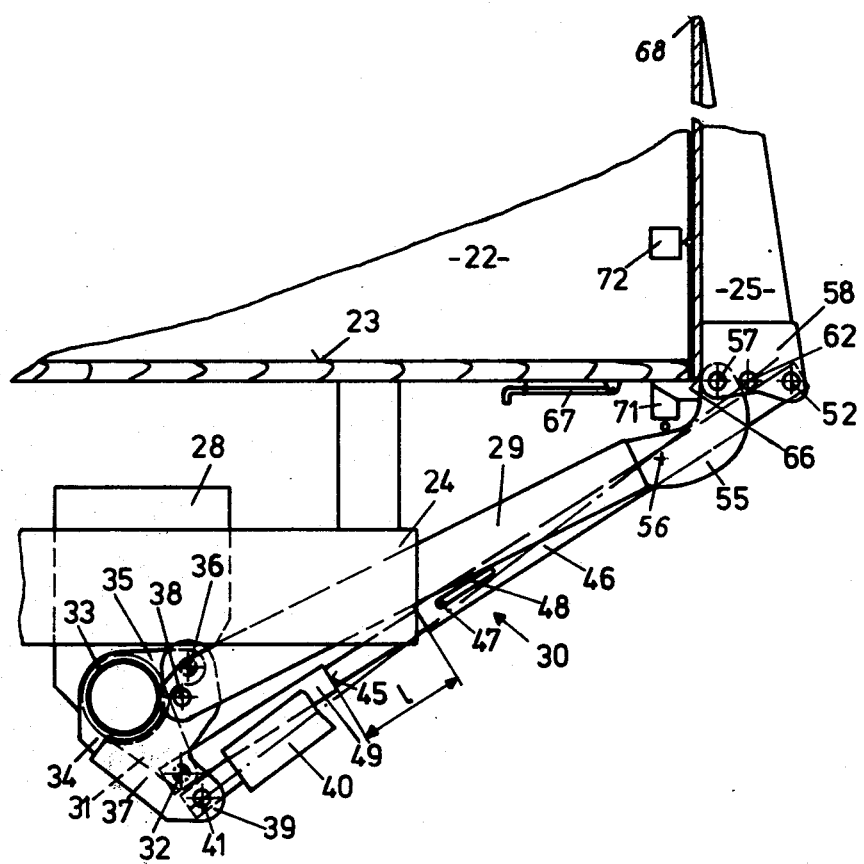
FIG. 10 is a diagrammatic side view corresponding to FIG. 3, showing the lifting platform in closed position as a tailgate.
Figure 10:
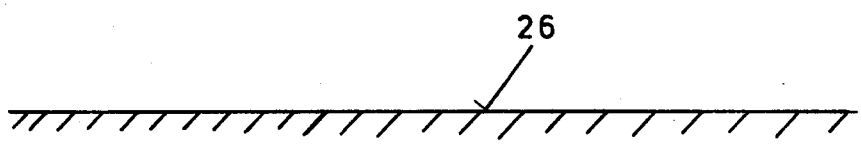
Figure 11:
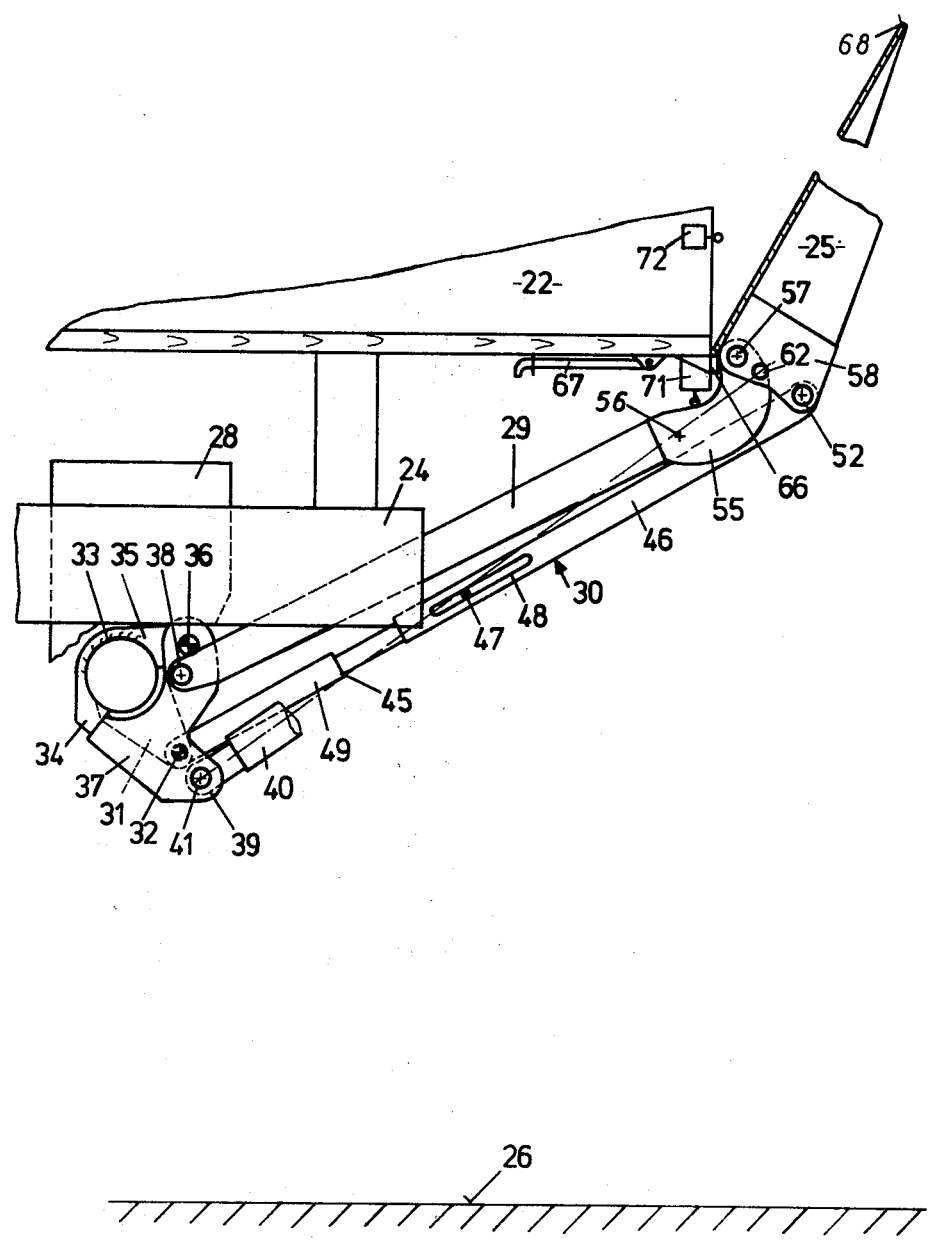
FIG. 11 is a diagrammatic side view corresponding to FIG. 10 in which the lifting platform is in a pivoted position in which it has just begun to open or is almost closed.

To enable the lifting platform 25 to be pivoted from its vertical into its horizontal position, the control valve 78 must be set to its "slow" position to counter excessively rapid pivoting of the platforms by additionally restricting the return of pressure medium through the restrictor 80. By actuating the lowering switch 86, the energizing winding 74b of the control valve 75 is energized and draws the valve member into the right-hand position so that pressure medium passes from the duct 73 through the common restrictor 74, the supplementary restrictor 80 and the return duct 82 into the reservoir 83. FIG. 10 shows the lifting platform in the closed position when the guide arm 30 is extended to a length at which the pull-limiting stop 47 comes into action in the slot 48 which is provided in the fixed part of the guide arm 30. The tension spring 50 will then exert its maximum pull. The lifting platform 25, previously locked with conventional locking means, not shown, to function as a tailgate, but unlocked before the switch 86 was actuated, will then begin to pivot about the pins 57 towards the horizontal position under the action of the tension spring 50. The stop abutment edge of the lifting platform will bear upon the supporting stop abutment 66 until it has moved through approximately one-third of the pivoting motion about the pins 57 from the vertical position towards the horizontal position. Under the action of the force exerted by the spring 50 and owing to the shift of the centre of gravity of the lifting platform from the vertical plane, approximately defined by the pins 57, there is produced a moment about the pivoting axis of the pins 57 to act only on the piston of the lifting - closing ram 40 which is hinged to the lifting platform 25 at a distance from the axis of pins 57. A reaction force also acts on the pistons of both rams, owing to the moment resulting from the total weight about the hinging means when the lifting platform edge 65 has reached approximately the position shown in FIG. 11 and is clear of the stop abutment 66. The forces which therefore act differently on the two pistons tend to drive the pressure medium out of the ram cylinders. Since the cylinders are interconnected by the common pressure medium duct 73 and discharge is possible only through the common restrictors 74 and 80, a pressure, which depends on the applied forces and on the restrictor cross-sections but is equal in both cylinder chambers, will be built up in both rams. Since the forces acting on the pistons are different because of the different hinging means, it follows that only the piston of the lifting and closing ram 40, hinged to the lifting platform 25 by means of the extension head 60, retracts into the ram cylinder so that when the parallelogram arms are in the top position the lifting platform is first pivoted into the horizontal position whereupon the pressure-limiting stops 45 come to bear upon the guide arms 30 so that equal reaction forces act on both ram pistons. Owing to the different means of hinging, the load moment resulting from the dead weight of the lifting platform 25, results in a retaining action on the lifting platform hinge pins 57, so that even in the absence of tension springs 50 or any other means of support, the pivoting axis of pins 57 remains at the height of the loading surface 23 until the lifting platform reaches the horizontal position. The lever arms and the directions in which the forces act in the illustrated embodiment are particularly advantageous in view of the illustrated position of the hinging axis already explained, but can be defined in accordance with the relevant requirements by the usual methods of determination. Not only the geometrical and kinematic conditions, but also the pressure build-up and pressure equalization must be suitably adapted.

Rapid lowering from the horizontal position after this is reached is brought about by moving the control view 78 into the "unrestricted" position shown in FIG. 1.

Advantageous conditions for the forces are obtained not only with regard to the bottom tilting action, but also with regard to supporting in the top position, by disposing the ram hinging axis on the support lever 37 between the plane 88 formed by the axes of pins 32 and 38 and the vertical plane 89 (FIG. 3) formed by the axes of pins 57 and 52. Unintentional lowering from the top position is reliably prevented in the exemplified embodiment after approximately one-third of the pivoting motion of the lifting platform 25. The forces of the rams can still act at advantageous angles even if a low support arrangement becomes necessary by virtue of the chassis part for mounting on the goods vehicle being situated at a low level and the lifting and guiding arms have to assume a very steep position to reach the loading surface. However, in this construction the resultant force will always be advantageously situated and act in an advantageous direction. Owing to the different means of hinging the two rams, the lifting platform 25 is not tilted upwardly in the course of the lifting and lowering motion, even when it is unloaded and in the horizontal position, because the different reaction forces which come into effect after the thrust limiting stop abutments 45 are lifted off always counteract such upward tilting. The tension springs 50 can also be prestressed when the stop abutment 45 is in contact. Undesirable upward tilting is also avoided because both rams move uniformly when the horizontal lifting platform is in the working range and the pivoting moment about the pins 57, which is constantly applied by the lifting and pivoting ram 40, is smaller than the corresponding reaction moment resulting from the dead weight of the lifting platform 25 which can be increased by the corresponding moment resulting from the spring force of the prestressed tension spring 50 and by a load. This is true because the pressures in the ram cylinders are equal because of the hydraulic inter-connection.

The lifting platform is stable as regards the risk of upward pivoting not only because of the top hinging of the rams and the hinging thereof on the support levers, but also in the region of the loading surface position itself for loads which act in the region of the platform edge, more particularly in view of the advantageous position of the different hinge axes in the region of the support means and the constructive steps taken to this end. The hinge pin 36 of the support lever 37 is offset from the plane 88 towards the plane 89 at an advantageous angle, i.e. with an advantageous length of arm and an advantageous horizontal distance. The loading device 20 can thus counter any unfavourable tilting moment about the hinge axis of pins 52 resulting from the position of the centre of gravity of the load, which would cause the support lever 37 to lift off its support lever stop abutment during operation, because the lever arm z shown in FIG. 8 and acting in the top position is selected so that, with the load in any of the positions on the lifting platform, a moment will always occur which will pivot the lever 37 towards the stop abutment 34. On the other hand, the magnitude of the lever arm z is selected so that downward tilting of the lifting platform end 68 is made possible by the ability of the lifting arm 29 to extend slightly in the manner of a toggle lever even in the topmost position when the locking device 67 acts on the lifting platform 25. On the other hand, the lever arm z' is selected in the bottom position shown in FIG. 9 so that a maximum distance between the lines of action is obtained which is such as to permit rapid tilting of the lifting platform onto the roadway in these cases, which occur more frequently, because the moment which results from the platform weight and pivots the support lever is always greater than in the top position, but the bottom edge of the platform remains first on the roadway 26 and does not shift because the toggle joint is formed on the top parallelogram arm. The change of length of the ram in this phase of movement is very advantageous due to the other hinging means so that it is possible to employ rams with a relatively short length of stroke.

Figure 12:
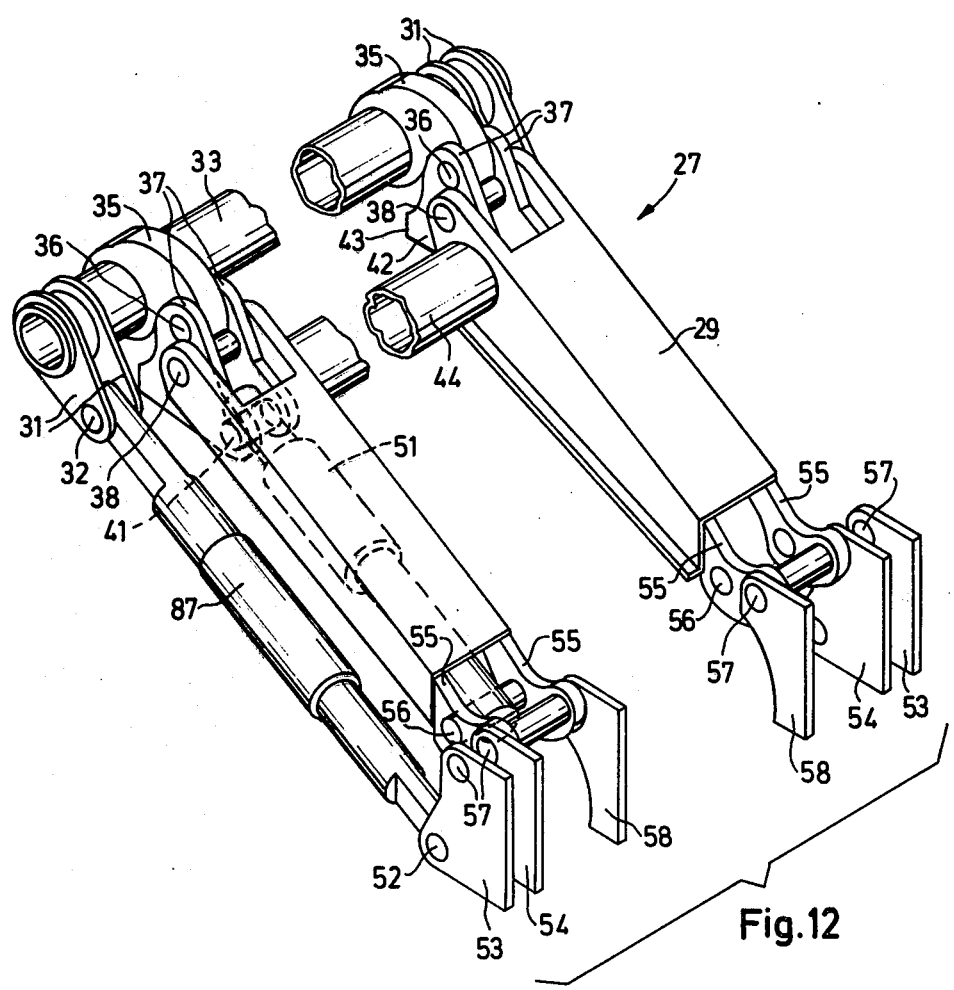
FIG. 12 is a perspective part-view corresponding to FIG. 2 but showing a second embodiment of the invention.
Figure 13:
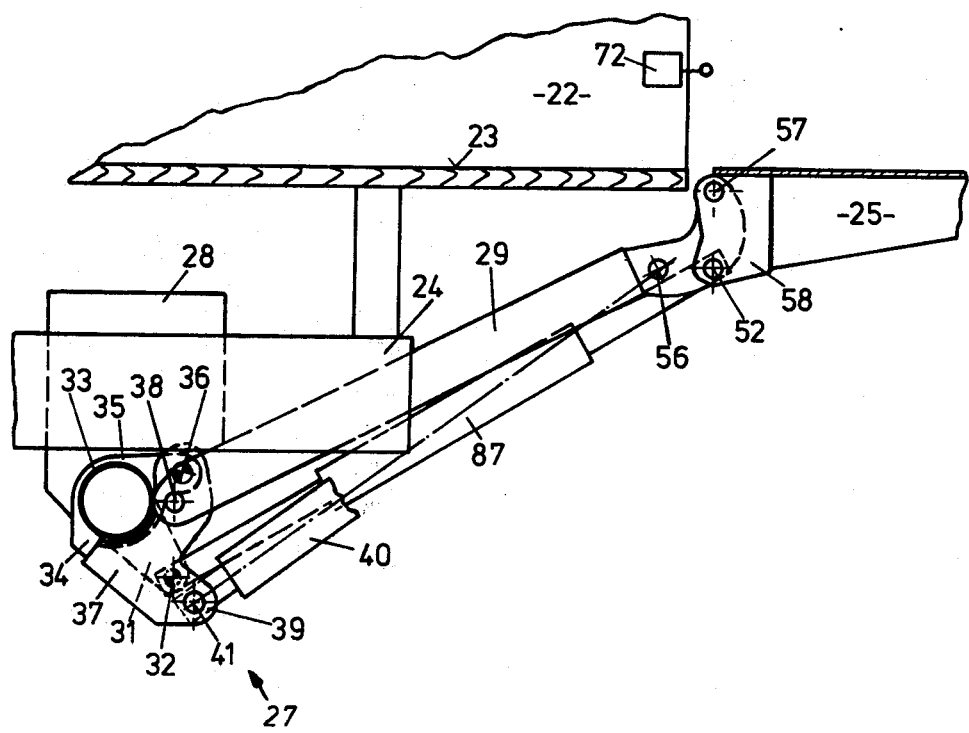
FIG. 13 is a diagrammatic side view, similar to FIG. 3, of the loading device according to FIG. 12

FIGS. 12 to 14 show another embodiment of the invention. For the most part it has completely identical components to those of FIGS. 1 to 11. Identical components have the same reference numerals. More particularly, the support system 27, the lifting arms 29 and the lifting platform 25 and its hinging system are all identical. The hydraulic rams are identical and they are hinged to both lifting arms along the common pivoting axis defined by hinge pins 56. However, an additional hydraulic ram 87 is provided on each side of the telescoping guide arms 30. The said rams 87 act between the hinge pins 32 and 52, to which they are pivotably attached. They can be used in conjunction with a corresponding control device to obtain a horizontal setting of the lifting platform 25 for operation of the loading device 20 between the roadway 26 and the loading surface 23 on an inclined roadway, i.e. if the front axle and the rear axle of the goods vehicle 21 are situated at different heights. The length of stroke of these rams is such that the tailgate closing and opening operation can be performed hydraulically therewith. This dispenses with different hinging of the lifting rams 51 and both engage in the bifurcated lifting platform ends 55 of the lifting arms 29 on the hinge pins 56 at the beginning of the offset portions of the arms.

No other modifications are necessary since bores are in any case provided on lifting arms which are manufactured on a mass production basis.

The electro-hydraulic control device must be adapted in a manner that will be clear to the expert. It is not shown, but again incorporates a common pressure medium duct 73, a common restrictor 74 and a common control valve 75 for each pair of rams. The movement ranges of the lifting platform 25 are restricted in the upward direction by limit switches 71 or 72. Changeover can also be controlled in part-functions by hydraulic means, instead of by an electric switch, by the operation of a pressure-limiting valve or pressure switch which comes into operation when the lifting platform abuts.

As can be seen, the two illustrated embodiments comprise completely identical components, with the exception of the hinging means for the rams and the construction of the guide arms. This results in an exceptionally advantageous unit construction system the parts of which can be readily recognized from the drawings and the explanation. The invention is not confined to the illustrated exemplified embodiments, and modifications can be made in the shape of the different arms and hinging parts, but the hinging axes must be provided in the regions described and must be selected in accordance with the principles described herein. The hinging elements on the lifting platform can also be modified. For example, in place of the fixed mounting lugs on the lifting platform, it is possible to provide only coupling elements between the lifting and guide arms on which lifting platforms can be supported which are otherwise freely pivotable in the upward direction and can be closed and opened manually as a tailgate and can also be stowed away under the loading surface, where appropriate, in the form of folding side walls.

What we claim is:

1. A loading device for a goods vehicle having a superstructure with a loading surface, comprising support means fixed to the vehicle between road level and said loading surface, a lifting platform for receiving goods to be loaded, two lifting arms and two associated guiding arms hinged at their inner ends to said support means and hinged at their outer ends to said lifting platform with said guiding arms below said lifting arms and with each lifting arm and associated guiding arm together with said support means and said lifting platform forming a parallelogram linkage, a pressure fluid operated cylinder-piston ram associated with each said parallelogram linkage, each of said rams being hinged at its inner end to said support means below the hinge axes of said lifting and guiding arms, the outer end of a first one of said rams being hinged to a first one of said lifting arms in the region of its outer end and a second one of said rams being hinged to said lifting platform at a distance from and below the hinge, connection of a second of said lifting arms to said lifting platform, means for supplying pressure fluid to said rams to actuate the same, both of said rams being operable in cooperation with said lifting arms to raise said lifting platform from a lower position to loading surface height and said second ram in cooperation with said second lifting arm being also operable to swing said lifting platform upwardly in a closing pivoting motion from horizontal position toward vertical position to act as a tailgate, said pressure fluid supply means comprising fluid connections between said rams to equalize the pressure therein, a fluid reservoir and a common return line from said rams to said reservoir, said return line having a restriction therein, whereby fluid pressure produced in said second ram by movement of said lifting platform from vertical position toward horizontal position by its own weight is transmitted through said fluid connections to said first ram to retain said lifting platform at loading surface height until it has returned to horizontal position.

2. A loading device according to claim 1, including an additional support for supporting the lifting platform in a third of the angular range of said closing pivoting motion that is adjacent ot the vertical position of the platform.

3. A loading device according to claim 2, in which said additional support is a stop abutment.

4. A loading device according to claim 3, in which the stop abutment is on the loading surface side adjoining the lifting platform at a level corresponding to the height of an edge of the lifting platform nearest to the vehicle superstructure in the vertical position of the lifting platform.

5. A loading device according to claim 1, including spring means for urging the platform in the reverse pivoting direction from the closed vertical position.

6. A loading device according to claim 5, in which said spring is a tension spring which acts on at least one of said guiding arms.

7. A loading device according to claim 6, in which each of guide arms is a telescopic arm with a thrust-limiting stop abutment.

8. A loading device according to claim 7, in which said tension spring is situated within at least one of said telescopic arms.

9. A loading device according to claim 7, in which said stop abutment defines the vertical position of the lifting platform.

10. A loading device according to claim 1, in which each of said guiding arms is a telescopic arm having an extensionlimiting stop abutment.

11. A loading device according to claim 10, in which a tension spring inside each of said telescopic arms acts to shorten said telescopic arm.

12. A loading device according to claim 1, in which each of said rams is single-acting.

13. A loading device according to claim 1, in which said first ram and said second ram have the same piston and cylinder size.

14. A loading device according to claim 13, in which said first ram and said second ram have the same length of stroke.

15. A loading device according to claim 14, in which said second ram is provided with an interchangeable head which increases the effective length of said second ram.

16. A loading device according to claim 15, in which said interchangeable head is upwardly offset.

17. A loading device according to claim 1, in which the inner end of each of said lifting arms is provided with a bifurcated head.

18. A loading device according to claim 1, in which each of said lifting arms is provided with a bifurcated head at its outer end.

19. A loading device according to claim 18, in which the bifurcated head at the outer end of each lifting arm is provided with a hinging bore for hinge connection to the lifting platform and with a hinging bore for the optional hinge connection of the outer end of the associate lifting ram.

20. A loading device according to claim 1, in which the outer end of each of said lifting arms is upwardly offset.

21. A loading device according to claim 1, in which each of said lifting arms is formed of a U-shaped cross section the open side of which faces downwardly.

22. A loading device according to claim 18, in which said first ram engages from below with the bifurcated head of said first lifting arm.

23. A loading device according to claim 1, in which at least one of said guiding arms comprises a pressure fluid operated piston-cylinder ram operably to swing said lifting platform from horizontal toward vertical position.

24. A loading device for a goods vehicle having a superstructure with a loading surface, comprising support means fixed to the vehicle between road level and said loading surface, a lifting platform for receiving goods to be loaded, a lifting arm and associated guiding arm hinged at their inner ends to said support means and hinged at their outer ends to said lifting platform with said guiding arm below said lifting arm and with said lifting arm and associated guiding arm together with said support means and said lifting platform forming a parallelogram linkage, at least one pressure fluid operated cylinder-piston ram hinged at its inner end to said support means below the hinge axes of said lifting arm and connected at its outer end to said lifting platform and means for supplying pressure fluid to said ram to actuate the same to raise and lower said lifting platform, said support means comprising a fixed support, a support lever hinged on said fixed support with a fixed hinge axis, means for fixedly supporting the hinge axis of said guiding arms on said fixed support at a location below the fixed hinge axis of said support lever, the inner ends of said lifting arm and inner end of said ram being hinged to said support lever, the fixed hinge axis of said support lever being above the hinge axes of the inner ends of said lifting arm and said ram, said support lever being limitedly rotatable about its fixed hinge axis, fixed abutment means against which said support lever rests during raising and lowering of said lifting platform and from which said support lever separates in the manner of a toggle lever system only for tilting said lifting platform to lower the outer end thereof.

25. A loading device according to claim 24, in which when said support lever rests on said abutment means, the angle between a plane defined by the hinge axes at inner ends of said lifting and guiding arms and a plane defined by the hinge axis at the inner end of said lifting arm and the hinge axis of the support lever is smaller than the angle between the plane defined by the hinge axes at the inner ends of said lifting and guiding arms and the longitudinal center line of said lifting arm when said lifting platform is in uppermost position.

26. A loading device according to claim 24, in which the hinge axis at the inner end of said ram is below the hinge axis at the inner end of said guide arm when the support lever rests on said abutment means.

27. A loading device according to claim 24, in which the hinge axis at the inner end of said ram is outside the parallelogram area defined by the lifting and guiding arms when the support lever rests on said abutment means.

28. A loading device according to claim 24, in which said fixed support of said support means comprises a carrier tube extending transversely of the vehicle, said abutment means comprising an abutment fixed on said tube, and in which the hinge axis of said support lever is located on the opposite side of said tube from said abutment.

29. A loading device according to claim 1, in which a stiffening tube extends between said lifting arms and has opposite ends fixed to said lifting arms respectively.

* * * * *